United States Patent

[11] 3,577,184

| [72] | Inventors | William O. McNeel;<br>Louis W. Erath, Houston, Tex. |
|---|---|---|
| [21] | Appl. No. | 807,186 |
| [22] | Filed | Mar. 14, 1969 |
| [45] | Patented | May 4, 1971 |
| [73] | Assignee | Geo Space Corporation |

[54] LOW-DISTORTION SEISMOMETER
9 Claims, 11 Drawing Figs.

| [52] | U.S. Cl. | 340/17 |
|---|---|---|
| [51] | Int. Cl. | H04r 9/04 |
| [50] | Field of Search | 340/17 |

[56] References Cited
UNITED STATES PATENTS

| 2,751,573 | 6/1956 | Millington | 340/17 |
|---|---|---|---|
| 3,242,459 | 3/1966 | McCollum | 340/17 |
| 3,344,397 | 9/1967 | Elliott et al. | 340/17 |
| 3,451,040 | 6/1969 | Johnson | 340/17 |

*Primary Examiner*—Rodney D. Bennett, Jr.
*Assistant Examiner*—Brian L. Ribando
*Attorney*—Michael P. Breston

ABSTRACT: A compact, high-sensitivity, low-distortion, electromagnetic-type seismometer having a pair of coils forming part of a mass-coil assembly concentrically suspended in an annular airgap established by a permanent magnet. The suspension system includes a pair of spring spiders which are clampingly secured to the mass-coil assembly by a pair of insulating retainer rings to allow the springs and the mass-coil assembly freedom of relative motion when the mass-coil assembly becomes subjected to unbalanced rotational moments. The symmetry of construction assures a compact, rugged seismometer of very low distortion. Advantage is taken of the preformed stresses in the springs to assure continuous, wiping, low-resistance contacts between the current-carrying springs and the coil terminals.

William O. McNeel &
Louis W. Erath
INVENTORS

BY Michael P. Breston

ATTORNEY

William O. McNeel &
Louis W. Erath
INVENTORS

BY Michael P. Breston

ATTORNEY

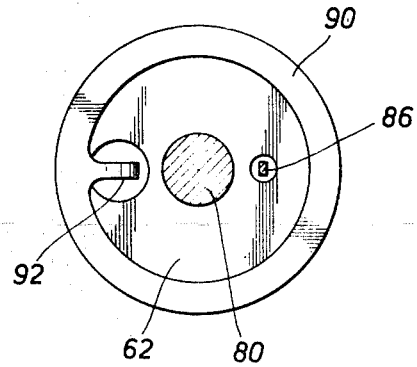
FIG. 6
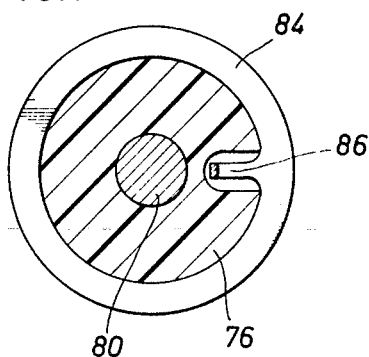
FIG. 7
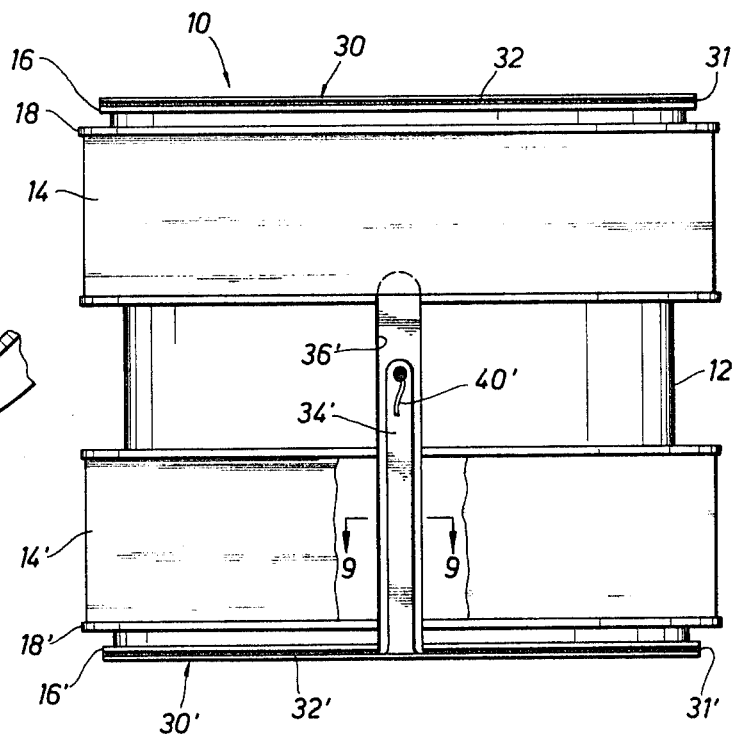
FIG. 8
FIG. 9
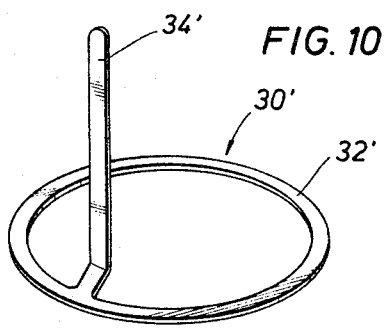
FIG. 10
William O. McNeel &
Louis W. Erath
INVENTORS
BY Michael P. Breston
ATTORNEY

LOW-DISTORTION SEISMOMETER

BACKGROUND OF THE INVENTION

Numerous types of seismometers are being used in the seismic industry to detect seismic waves produced by artificial detonations as by explosives or gas-operated seismic energy sources. The most common type of seismometer now in use is the electromagnetic moving coil type. It includes a mass-coil assembly and a magnet assembly. The magnet assembly is rigidly fixed in a casing with respect to the earth. The mass-coil assembly is suspended in the casing by a spring suspension system which includes a pair of spring spiders. Vibrations of the earth are transferred to the mass-coil assembly. The displacement of the coils within an annular magnetic field results in a voltage or current becoming generated within the coils proportional to the velocity of motion of the coil assembly.

Contemporary seismic exploration methods call for digital instrumentation to rapidly replace conventional analog instruments. To obtain greater reliability and linearity of response of the entire digital system, modern seismometers are required to be relatively small, rugged, inexpensive, yet provide low distortion and a linearity of response not obtainable from prior art seismometers of the above character.

One approach taken by the industry was to significantly reduce the size of seismometers. However, in the process of miniaturization, certain manufacturing difficulties were encountered: the assembly of relatively small geophones became a task requiring relatively skilled labor with its attendant high manufacturing cost. The miniaturization process also produced relatively fragile suspension systems causing frequent breakdowns during field operations.

In field work it is often necessary to position the seismometers in very soft or sandy soil such as that encountered in marshes, at the bottoms or along the shores of rivers and lakes, etc. Some of the soil is of gelatinous consistency and of low density and consequently is characterized by a relatively poor wave transmission quality. As a result modern seismometers are required not only to be compact but exhibit high sensitivity even when coupled to soils of poor wave transmission quality.

Moreover since the seismometers are frequently positioned in groups to form arrays, it is desired that the seismometers within each group provide signals which are substantially in phase and of minimal harmonic content. This is especially true when some seismometers within the same array are coupled to "hard" soil while others are coupled to "soft" soil.

SUMMARY OF THE INVENTION

The seismometer of the present invention is of the moving coil, electromagnetic type having a mass-coil assembly and a magnet assembly. The coil assembly is supported by a spring suspension system which includes a pair of spring spiders. The electric circuit for the coil assembly includes a path through the spring spiders and the magnet assembly. The various elements of both assemblies are arranged for stacking within each other thereby avoiding the necessity for soldered joints and for conductors which would tend to break under field use or to introduce spurious resonant characteristics not compatible with the desired quality of the output signal.

By symmetrically disposing the stacked components and by maintaining the various electric contact surfaces in a stressed condition, greater linearity of operation over a wider frequency range is achieved with a seismometer of the present invention.

Accordingly, the seismometer herein described provides a high degree of linearity, low harmonic content, together with a simplified assembly, dependable operation in field use, and low cost of manufacturing.

The novel manner of securing the spring spiders to the mass-coil assembly significantly extends the life of the springs and provides for better insulation from the magnet assembly. The securing is achieved by a pair of spring retainer rings each preferably having a tapered groove to accommodate variations in accumulated thickness tolerances and to exert a continuous retaining pressure.

BRIEF DESCRIPTION OF THE DRAWINGS

FIG. 6 is a cross-sectional view along line 6—6 in FIG. 2;

FIG. 7 is a cross-sectional view along line 7—7 in FIG. 2;

FIG. 8 is a view in elevation of the coil assembly;

FIG. 9 is a cross-sectional view along line 9—9 in FIG. 8; and

FIG. 10 is a three-dimensional view of a spring contact element.

Throughout the FIGS., identical numerals are used to designate identical parts. For ease of explanation and to take advantage of symmetry, the second part in each pair is designated with a prime (').

The mass-coil assembly generally designated as 10 includes a unitary cylindrical housing 12 having a thin wall provided with radially extending shoulders to accommodate two coils 14–14', each having a plurality of turns of insulated wire. The body of cylinder 12 is made of anodized aluminum. The ends of cylinder 12 are provided with radially extending shoulders 16–16' adjacent to which are also provided shoulders 18–18' extending further in a radial direction than shoulders 16–16' to retain spring retainers 100–100'.

Figure 1:
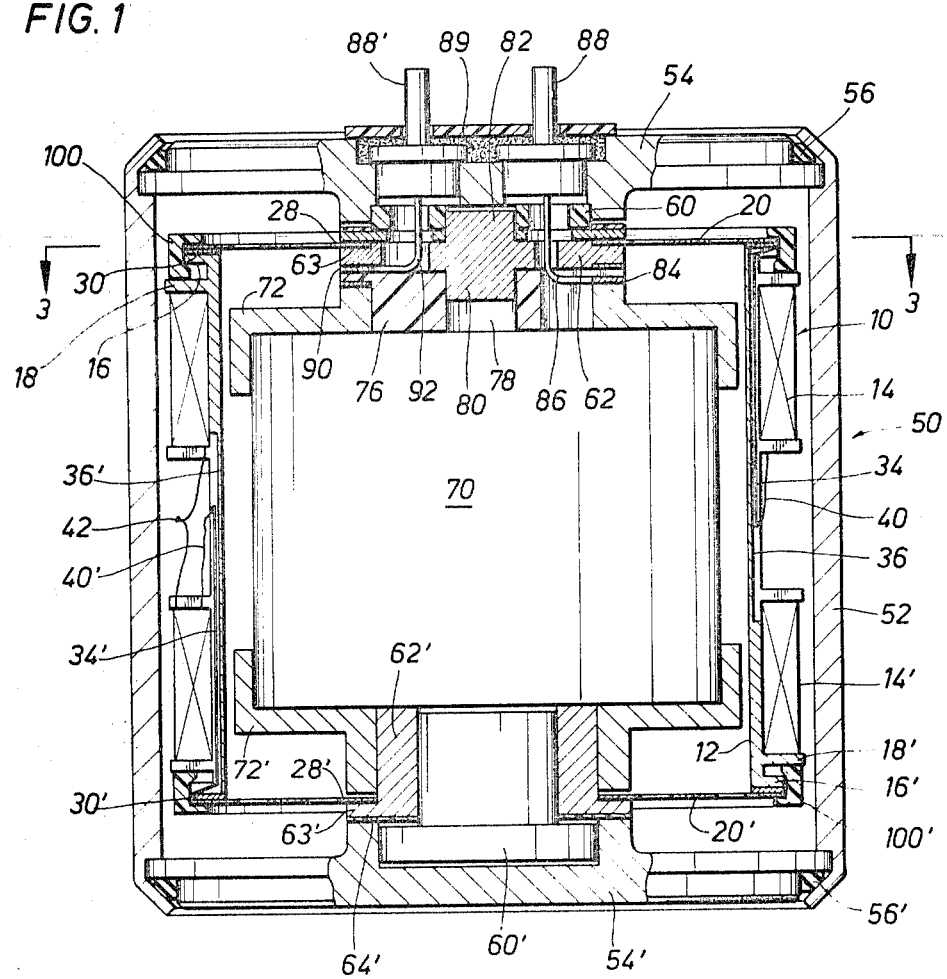
FIG. 1 is a cross-sectional view of a preferred embodiment of the seismometer constructed in accordance with the present invention.
Figure 2:
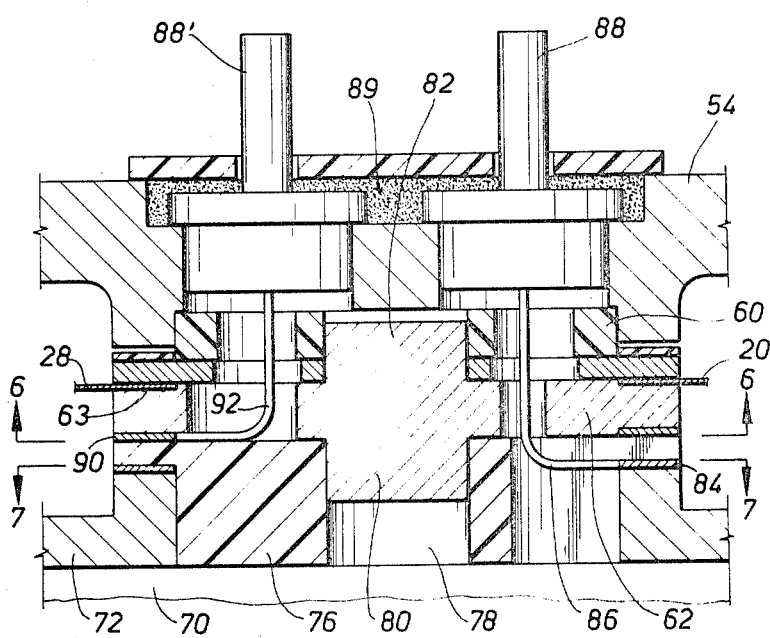
FIG. 2 is an enlarged view of the upper portion of the seismometer shown in FIG. 1.
Figure 3:
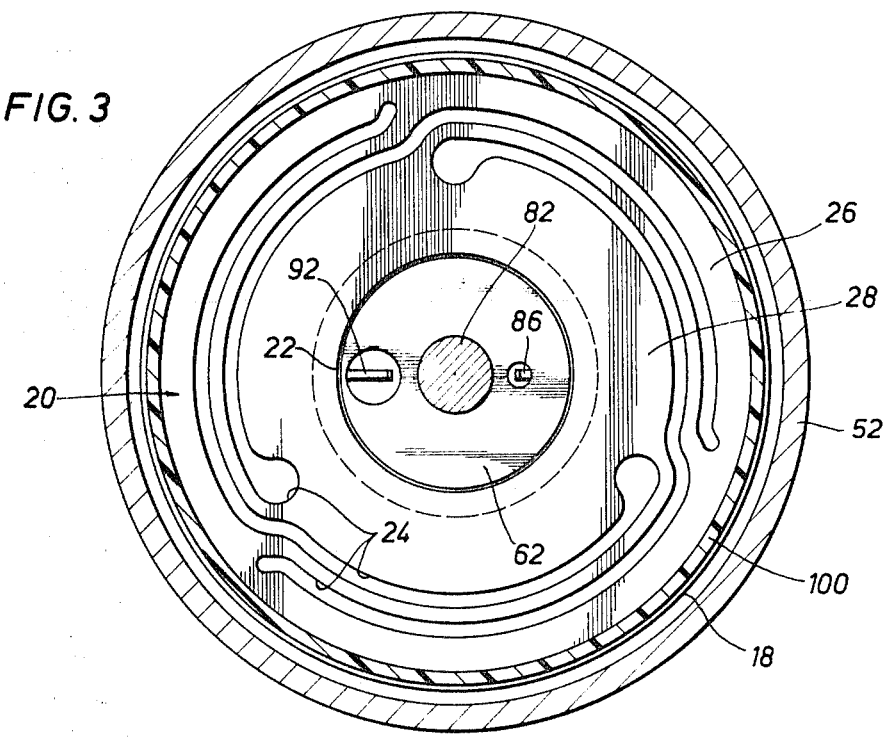
FIG. 3 is a top view taken along lines 3—3 of FIG. 1.
Figure 4A:
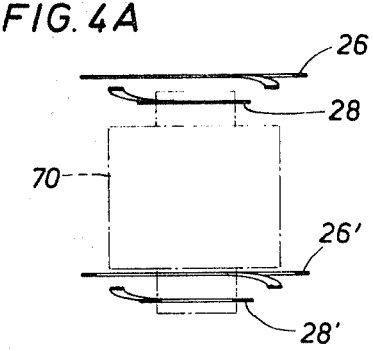
FIGS. 4A and 4B are views in cross section of the springs in their relaxed and weighted modes.
Figure 4B:
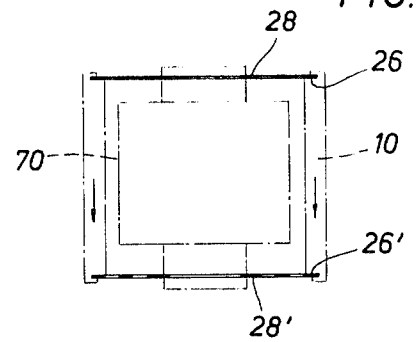

Assembly 10 is resiliently suspended from two disc-shaped spring spiders 20–20'. Spring 20 has a center opening 22 and three incisions 24 symmetrically arranged as better shown in FIG. 3. Springs 20–20' are typically made of barillium copper and incisions 24 are etched out in a conventional manner. The springs are preformed (FIG. 4) so that outer edge 26 is in a plane above the plane containing the inner edge 28. When the mass of the coil assembly 10 is suspended, springs 20–20' become substantially flat, as better shown in FIGS. 4A and 4B.

To make electrical contact with the coils there is provided a top coil contact 30 and a lower coil contact 30'. Contact 30 has an annular portion 32 and an upwardly extending lug 34 (FIG. 10). Contact 30 is glued at 31 to shoulder 16 of coil housing 12. Lug 34' of contact 30' sits inside a recess 36' in the outer wall of coil housing 12. The upper coil contact 30 has its lug 34 extending inside a recess 36 in the outer wall of housing 12. One lead of coil 14 is connected to lug 34 by conductor 40. One lead of coil 14' is connected to lug 34' by conductor 40'. The remaining leads of coils 14–14' are interconnected at junction 42.

The stationary mass magnet assembly generally designated as 50 includes a hollow outer iron cylinder 52, closed at the top and bottom by nonmagnetic cover plates 54–54'. Seal rings 56–56' hermetically seal the inside coil assembly 10 within casing 52. Plates 54–54' serve as support and centering elements as well. Supported by plate 54' is a bottom centering insulator post 60'. Supported by plate 54 is an insulator centering ring 60'. A bottom spring contact 62' is insulated from plate 54' by a nonconducting washer 64'. A top spring contact 62 makes a contact with the inner lip 28 of spring 20.

The magnetic field is established by a permanent magnet 70 combined with upper and lower pole pieces 72–72', each having a Z-shaped cross section to centrally maintain magnet 70 within casing 52. An insulating lower-centering ring 76 having a center recess 78 is adapted to receive the lower center finger 80 of spring contact 62' whose upper center finger 82 fits inside an opening of the upper centering ring 60. A conductor contact washer 84 having an axially extending lug 86 fits inside one outer terminal 88. Contact 84 rests on the top pole piece 72. Another contact 90 having an axially extending lug 92 fits inside the other outer terminal 88'. Contacts 84 and 90 are insulated from each other by the centering ring 76. The output terminals 88–88' are insulated from each other electrically by a layer of epoxy 89.

The electric circuit can be traced through the following members: 88', 90, 62, 20, 34, 40, 14, 42, 14', 40', 30', 20', 62', 70, 72, 84 and 88.

It will be appreciated from the description thus far provided that the various components going into the making of the mass-coil and magnet assemblies 10 and 50 are pressure-fitted and stacked inside each other thereby requiring a minimum of assembly time by relatively unskilled labor. The design also lends important operational advantages some of which will now be described.

The arrangement of the mass-coil and magnet assemblies is symmetrical within casing 52 relative to both horizontal and vertical planes passing through the center of the permanent magnet 70. This symmetrical arrangement results in a seismometer which generates a minimum of harmonic content especially a minimum of the second harmonic. Even production specimens of the seismometer of the present invention are characterized by a second harmonic content of less than 0.2 percent.

Another important advantage of this invention is the provision of excellent pressure contact engagements between the springs and their respective contacts. Thus, the inner lip 28' of the bottom spring 20' is resting on a flat shoulder 63' of the bottom contact 62'. Since spring 20' is preformed to raise the outer lip 26' above the inner lip 28', the mass of the coil assembly 10 compresses the spring to become flat and by so doing presses the inner lip 28' against shoulder contact 63'. Hence, after considerable use, the compressional force of the spring continuously maintains excellent contact between spring 20' and its mating contact 62'. Similar considerations will show that the inner lip 28 of spring 20 is continuously forced against shoulder 63 of upper contact 62 by the preformed stress in spring 20.

Figure 5:
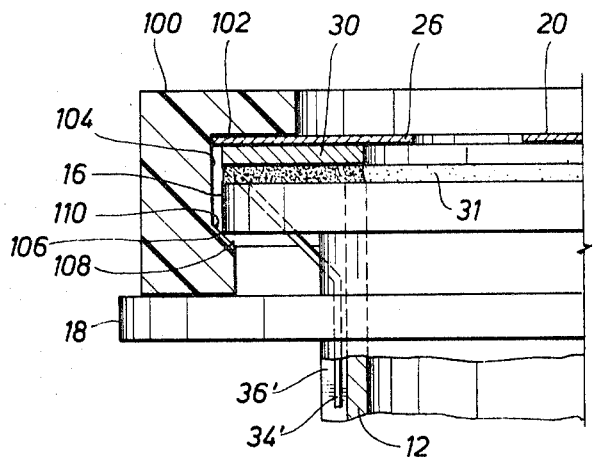
FIG. 5 is a detail view in cross section of the spring retainer ring and the elements retained thereby.

Referring now to FIG. 5, it will be seen that the outer lip or edge 26 of spring 20 is grouped together with coil contact 30 and shoulder 16 of coil body 12. It is desired, of course, to maintain excellent and continuous electrical contact between lip 26 and contact 30 and yet provide for relative displacement therebetween to prevent one or more of the etched out arms in spring 20 from breaking, a frequent failure in prior art seismometers. This is accomplished in accordance with this invention by the top spring retainer ring 100 and the bottom spring retainer ring 100'.

The spring retainer rings 100–100', in the preferred embodiment, must also act as insulators to prevent the springs from becoming short-circuited by either the upper or lower cover plates 54–54'. Each spring retainer ring 100 provides a flat shoulder 102, a vertical wall 104 and a tapered shoulder 106. Walls 102, 104 and 106 therefore form a tapered groove. The bottom spring retainer ring 100' is identically formed.

It will be appreciated that, even with close manufacturing tolerances, the thicknesses of the three sandwiched members 102, 30 and 16 will vary. For example, if the tolerances are all "positive," then the combined thickness of these three elements will bring them down on the tapered wall 106 to a point 108. On the other hand, should the tolerances be "negative" then the combined thickness of the three elements will engage the slope 106 at a point 110 above point 108. Thus, even with manufacturing tolerances under the most adverse conditions during assembly, the coil housing 12 will slide between points 108 and 110 and will allow the tapered wall 106 to exert an upward force F against shoulder 16 thereby maintaining excellent electrical contact between outer lip 26 and coil contact 30. The spring retainer ring 100 can be manufactured inexpensively from a mold. Another advantage obtained by using ring 100 is that it serves as a bumper to protect the coil housing 12 from becoming damaged when it hits, during its extreme excursions, either the upper cover plate 54 or the lower plate 54'.

In operation, the mass-coil assembly 10 is the inertial element of the seismometer and is suspended by the spider springs 20–20' in the annular airgap provided by the magnet assembly 50. Vibration causes relative displacement between the coil assembly 10 and the magnet assembly 50 thereby generating an electromotive force in the coils 14–14' which appears at the output terminals 88–88'. The selection of the springs, their thickness, weight, together with other design conditions are well understood in the art.

By using the above-described construction principles, a seismometer has been constructed which has a diameter of 1.25, a height of 1.32, a mass for the coil assembly 10 of 6.15 grams and a total weight for the seismometer of 3.9 oz.

From the foregoing it will be understood that this invention is well adapted to achieve the desired objects above-described together with other objects which will become readily apparent to those skilled in the art.

We claim:

1. A seismometer including in combination:
   a cylindrical, tubular casing of magnetic material;
   flux establishing means comprising,
     a permanent magnet in said casing,
     a pole piece at each end of said magnet magnetically coupled with each end of said casing to establish an annular airgap therein;
   a cover plate at each end of said casing to seal the interior volume thereof;
   a mass-coil assembly comprising,
     a pair of coils,
     each coil being adapted to generate an electric signal when linked by a changing magnetic flux in said airgap, and
     a hollow cylindrical housing supporting said coils on its outer cylindrical wall, said wall defining a pair of end edges;
   a pair of springs for supporting said mass-coil assembly in and from said cover plates for relative axial movement in respect to said flux establishing means thereby creating said changing magnetic flux; and
   a pair of resilient retaining means for frictionally engaging said springs with said end edges whereby said springs and said housing become susceptible of relative rotation.

2. A seismometer including in combination:
   a cylindrical, tubular casing of magnetic material;
   flux establishing means comprising,
     a cylindrical permanent magnet in said casing,
     a pole piece at each end of said magnet magnetically coupled with each end of said casing to establish an annular airgap therein;
   a cover plate at each end of said casing to seal the interior volume thereof;
   a mass-coil assembly comprising,
     a pair of similar coils,
     each coil being adapted to generate an electric signal when linked by a changing magnetic flux in said airgap,
     a hollow cylindrical housing supporting at each end of its outer cylindrical wall one of said coils, and
     said housing defining a shoulder at each of its end edges;
   a pair of disc-type spider springs for supporting said mass-coil assembly in and from said cover plates for relative axial movement in respect to said flux establishing means thereby creating said changing magnetic flux; and
   a pair of resilient retaining means,
   each retaining means crampingly retaining one of said shoulders with the outer edge of one of said springs whereby said springs and said housing become susceptible of relative rotation.

3. The seismometer of claim 2 wherein said resilient retaining means is an insulating ring having an inner groove defined by a substantially horizontal wall, a substantially vertical wall and a tapered wall.

4. The seismometer of claim 3 and further including:
   a pair of outer, annular spring contact elements, each element positioned adjacent to the edge of each spring, and said resilient retaining means crampingly engaging said shoulder, said edge of said spring and said contact element whereby said tapered wall causes said spring to frictionally engage with its mating contact element to provide a good electrical contact therebetween.

5. The seismometer of claim 4 and further including:
a pair of inner spring contact elements, said spring defining a center opening, and
each inner spring contact element frictionally engaging the edge of each spring at said center opening.

6. The seismometer of claim 5 wherein each spring has a preformed stress which causes the spring to frictionally engage its mating inner and outer contact elements.

7. The seismometer of claim 6 wherein the electric circuit between said coils is established through said springs and said flux establishing means.

8. The seismometer of claim 7 wherein said springs, said inner and said outer contact elements, and said flux establishing means are symmetrically disposed within said casing.

9. The seismometer of claim 8 wherein the elements in said casing are stacked during assembly of said seismometer.